United States Patent
Arch

[19]

[11] Patent Number: 6,085,398
[45] Date of Patent: Jul. 11, 2000

[54] DUAL DISK BRAKE PAD SPREADER

[76] Inventor: Edward T. Arch, 5916 S. Switzer Ave., Tampa, Fla. 33611

[21] Appl. No.: 09/031,505

[22] Filed: Feb. 26, 1998

[51] Int. Cl.[7] .................................................. B23P 19/04
[52] U.S. Cl. .............................................. 29/239; 29/266
[58] Field of Search ............................. 29/258, 259, 260, 29/263, 264, 266, 239

[56] References Cited

U.S. PATENT DOCUMENTS

| | | | |
|---|---|---|---|
| 4,406,182 | 9/1983 | Antone | 29/266 |
| 4,809,567 | 3/1989 | Bongard | 29/239 |
| 4,989,311 | 2/1991 | Rosin | 29/259 |
| 5,018,261 | 5/1991 | Markous | 29/266 |
| 5,269,053 | 12/1993 | Hicks | 29/266 |

*Primary Examiner*—Robert C. Watson

[57] ABSTRACT

A new dual disk brake pad spreader for positioning the pistons of a dual piston caliper assembly into the piston cylinders of the caliper to provided proper clearance so that a disk brake pad may be installed. The inventive device includes a plate having first and second surfaces, a pair of end edges, a pair of side edges extending between the end edges. The plate has a plurality of spaced apart holes which are extended between the surfaces of the plate with one of the holes positioned towards one of the end edges of the plate and the other hole positioned towards the other end edge of the plate. A pair of nuts are associated with each of the holes of the plate. Each of the nuts has a threaded opening therethrough. One of the pair of nuts is coupled to the first surface of the plate while the other nut of the pair is coupled to the second surface of the plate. A threaded bolts is threadedly inserted through an associated hole and its associated pair of nuts.

17 Claims, 2 Drawing Sheets

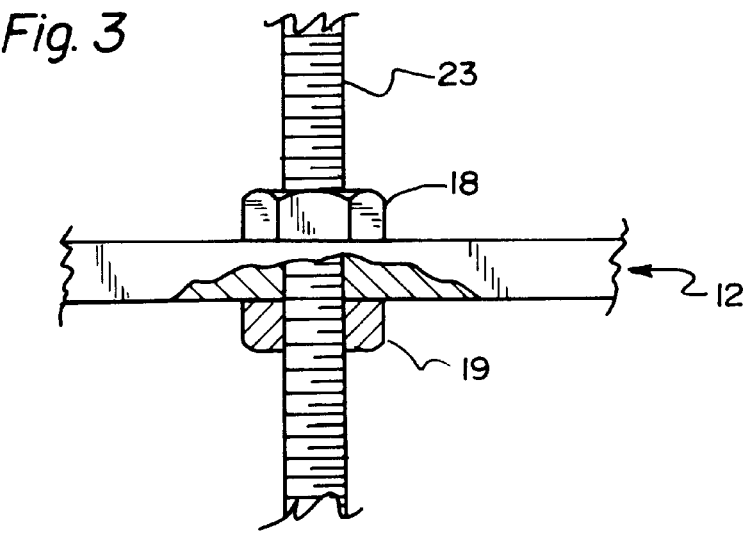
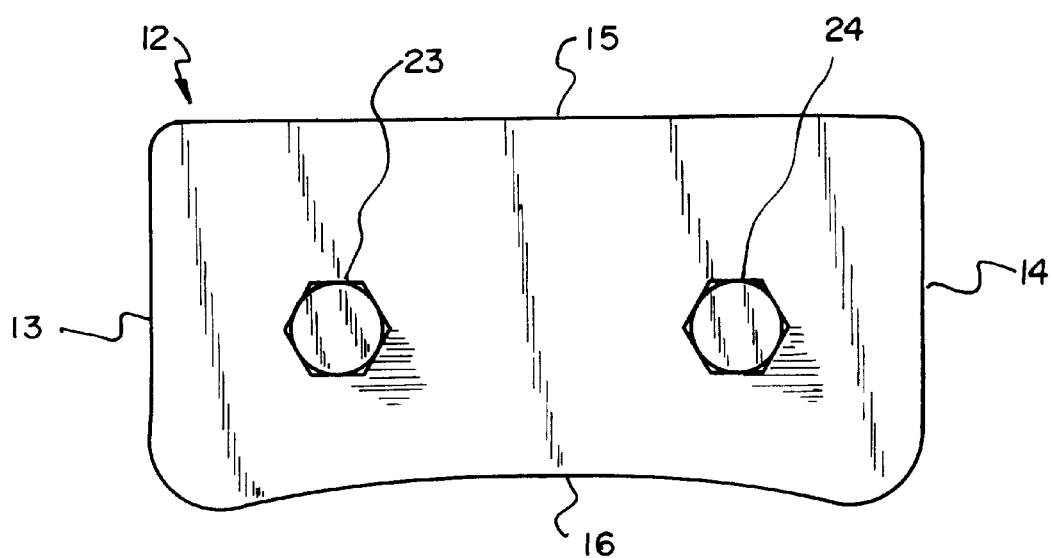

DUAL DISK BRAKE PAD SPREADER

BACKGROUND OF THE INVENTION

1. Field of the Invention

The present invention relates to disk brake tools and more particularly pertains to a new dual disk brake pad spreader for positioning the pistons of a dual piston caliper assembly into the piston cylinders of the caliper to provided proper clearance so that a disk brake pad may be installed.

2. Description of the Prior Art

The use of disk brake tools is known in the prior art. More specifically, disk brake tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art disk brake tools include U.S. Pat. No. 5,018,261; PCT Patent No. WO 90/02018 (Inventor: Zukaitis); U.S. Pat. No. 4,288,899; U.S. Pat. No. 4,671,144; U.S. Pat. No. 3,055,093; U.S. Pat. No. 2,592,420; and PCT Patent No. WO 95/10393 (Inventor: Harmand).

While these devices fulfill their respective, particular objectives and requirements, the aforementioned patents do not disclose a new dual disk brake pad spreader. The inventive device includes a plate having first and second surfaces, a pair of end edges, a pair of side edges extending between the end edges. The plate has a plurality of spaced apart holes which are extended between the surfaces of the plate with one of the holes positioned towards one of the end edges of the plate and the other hole positioned towards the other end edge of the plate. A pair of nuts are associated with each of the holes of the plate. Each of the nuts has a threaded opening therethrough. One of the pair of nuts is coupled to the first surface of the plate while the other nut of the pair is coupled to the second surface of the plate. A threaded bolts is threadedly inserted through an associated hole and its associated pair of nuts.

In these respects, the dual disk brake pad spreader according to the present invention substantially departs from the conventional concepts and designs of the prior art, and in so doing provides an apparatus primarily developed for the purpose of for positioning the pistons of a dual piston caliper assembly into the piston cylinders of the caliper to provided proper clearance so that a disk brake pad may be installed.

SUMMARY OF THE INVENTION

In view of the foregoing disadvantages inherent in the known types of disk brake tools now present in the prior art, the present invention provides a new dual disk brake pad spreader construction wherein the same can be utilized for positioning the pistons of a dual piston caliper assembly into the piston cylinders of the caliper to provided proper clearance so that a disk brake pad may be installed.

The general purpose of the present invention, which will be described subsequently in greater detail, is to provide a new dual disk brake pad spreader apparatus and method which has many of the advantages of the disk brake tools mentioned heretofore and many novel features that result in a new dual disk brake pad spreader which is not anticipated, rendered obvious, suggested, or even implied by any of the prior art disk brake tools, either alone or in any combination thereof.

To attain this, the present invention generally comprises a plate having first and second surfaces, a pair of end edges, a pair of side edges extending between the end edges. The plate has a plurality of spaced apart holes which are extended between the surfaces of the plate with one of the holes positioned towards one of the end edges of the plate and the other hole positioned towards the other end edge of the plate. A pair of nuts are associated with each of the holes of the plate. Each of the nuts has a threaded opening therethrough. One of the pair of nuts is coupled to the first surface of the plate while the other nut of the pair is coupled to the second surface of the plate. A threaded bolts is threadedly inserted through an associated hole and its associated pair of nuts.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dual disk brake pad spreader apparatus and method which has many of the advantages of the disk brake tools mentioned heretofore and many novel features that result in a new dual disk brake pad spreader which is not anticipated, rendered obvious, suggested, or even implied by any of the prior art disk brake tools, either alone or in any combination thereof.

It is another object of the present invention to provide a new dual disk brake pad spreader which may be easily and efficiently manufactured and marketed.

It is a further object of the present invention to provide a new dual disk brake pad spreader which is of a durable and reliable construction.

An even further object of the present invention is to provide a new dual disk brake pad spreader which is susceptible of a low cost of manufacture with regard to both materials and labor, and which accordingly is then susceptible of low prices of sale to the consuming public, thereby making such dual disk brake pad spreader economically available to the buying public.

Still yet another object of the present invention is to provide a new dual disk brake pad spreader which provides in the apparatuses and methods of the prior art some of the advantages thereof, while simultaneously overcoming some of the disadvantages normally associated therewith.

Still another object of the present invention is to provide a new dual disk brake pad spreader for positioning the pistons of a dual piston caliper assembly into the piston cylinders of the caliper to provided proper clearance so that a disk brake pad may be installed.

Yet another object of the present invention is to provide a new dual disk brake pad spreader which includes a plate having first and second surfaces, a pair of end edges, a pair of side edges extending between the end edges. The plate has a plurality of spaced apart holes which are extended between the surfaces of the plate with one of the holes positioned towards one of the end edges of the plate and the other hole positioned towards the other end edge of the plate. A pair of nuts are associated with each of the holes of the plate. Each of the nuts has a threaded opening therethrough. One of the pair of nuts is coupled to the first surface of the plate while the other nut of the pair is coupled to the second surface of the plate. A threaded bolts is threadedly inserted through an associated hole and its associated pair of nuts.

Still yet another object of the present invention is to provide a new dual disk brake pad spreader that makes it easier to spread the pistons of a caliper assembly so that a disk brake pad may be inserted into the caliper assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic sectional view of the present invention taken from line 3—3 of FIG. 2.

FIG. 4 is a schematic top side view of the embodiment of the present invention without the side tabs.

DESCRIPTION OF THE PREFERRED EMBODIMENT

Figure 1:
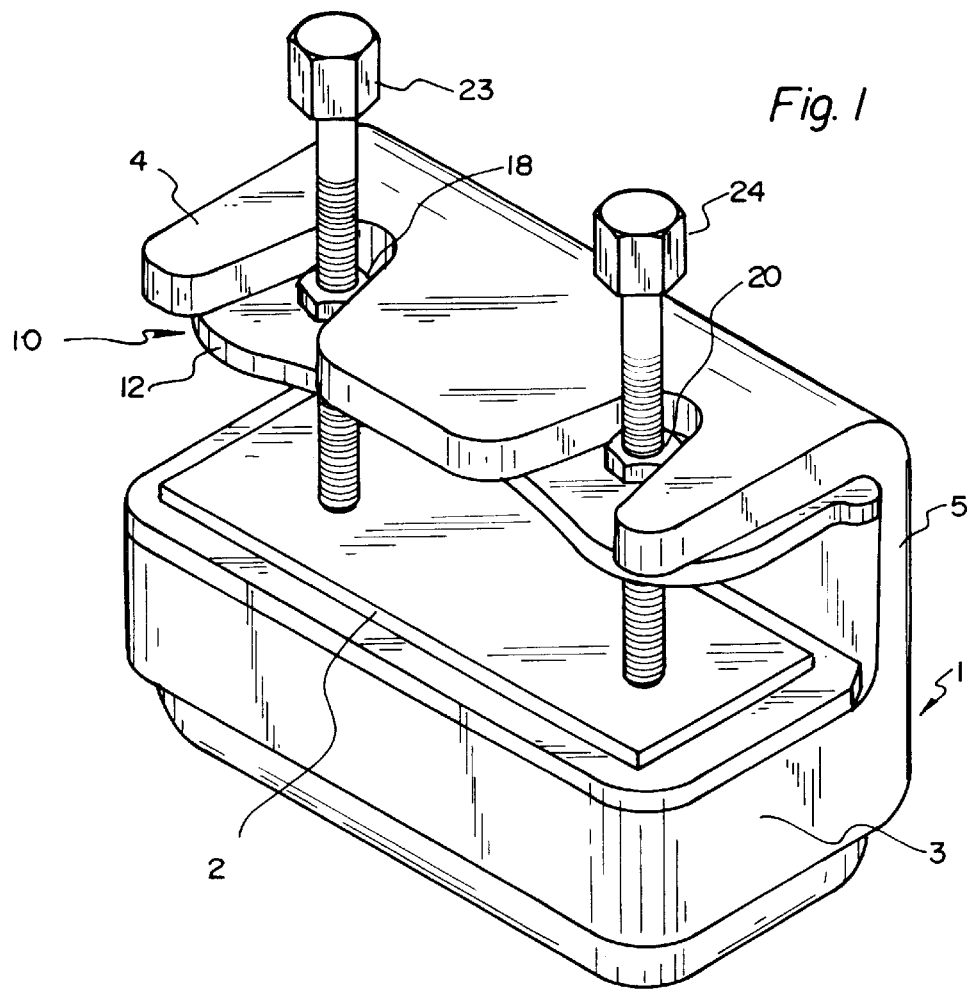
FIG. 1 is a schematic perspective view of a new dual disk brake pad spreader in use according to the present invention.

With reference now to the drawings, and in particular to FIGS. 1 through 4 thereof, a new dual disk brake pad spreader embodying the principles and concepts of the present invention and generally designated by the reference numeral 10 will be described.

The dual disk brake pad spreader is designed for use with a disc brake assembly having a caliper body 1, a pair of pistons 2, and at least one brake pad. The caliper body 1 has a pair of piston cylinders 3 and a side wall 4. The piston cylinders 3 are spaced apart from the side wall 4 of the caliper body 1 to define a channel for positioning the brake pad. The side wall 4 also has a pair of openings therethrough into the channel which are aligned with an associated piston cylinder. Each of the pistons 2 is disposable in an associate piston cylinder 3 of the caliper body 1 so that the pistons 2 are extendable into the channel of the caliper body 1. As best illustrated in FIGS. 1 through 4, the dual disk brake pad spreader 10 generally comprises a plate 12 having first and second surfaces, a pair of end edges 13,14, a pair of side edges 15,16 extending between the end edge 13,14. The plate 12 has a plurality of spaced apart holes which are extended between the surfaces of the plate 12 with on of the holes positioned towards one of the end edges 13,14 of the plate 12 and the other hole positioned towards the other end edge of the plate 12. A pair of nuts 18,20,21 are associated with each of the holes of the plate 12. Each of the nuts 18,20,21 has a threaded opening therethrough. One of the pair of nuts 18,20,21 is coupled to the first surface of the plate 12 while the other nut of the pair is coupled to the second surface of the plate 12. A threaded bolts 23,24 is threadedly inserted through an associated hole and its associated pair of nuts 18,20,21.

In closer detail, the plate 12 is generally rectangular and has first and second surfaces which are preferably substantially planar. The plate also has a pair of end edges 13,14 and a pair of side edges 15,16 extending between he end edges 13,14 with a plurality of corners formed at each intersection of the ends and side edges. The corners are preferably rounded. The plate 12 is designed for inserting into the channel of a caliper body 1 and positioning adjacent the side wall 4 of a caliper body 1. The plate has a length defined between its end edges 13,14. Ideally, the length of the plate is less than about 6½ inches. The plate also has a width defined between its side edges 15,16. In the ideal embodiment, the width is less than about 2¾ inches. In this ideal embodiment the thickness of the plate between the surfaces of the plate 12 is less than about 3/16 inch.

Figure 2:
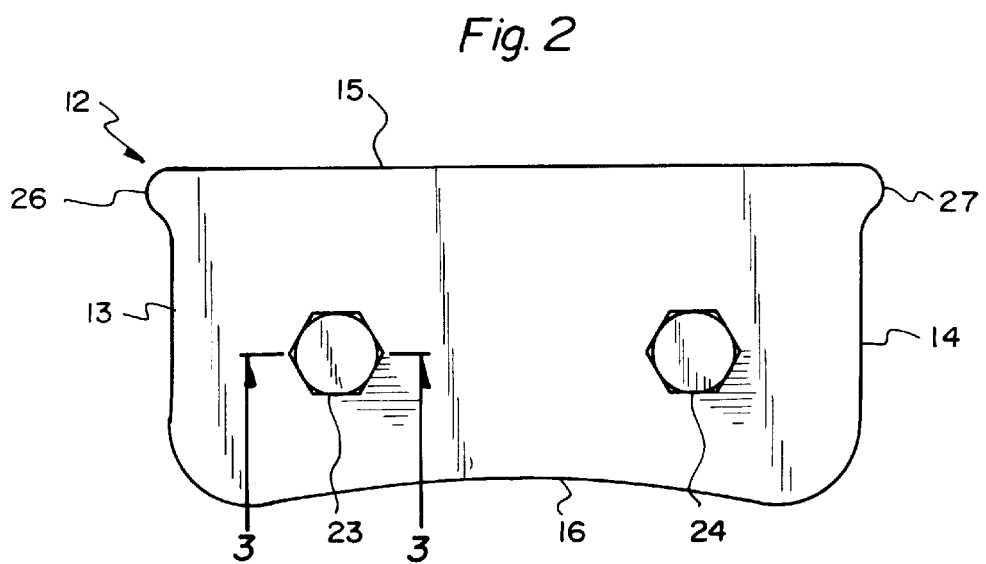
FIG. 2 is a schematic top side view of the present invention.

Preferably as illustrated in FIGS. 2 and 4, one of the side edges 16 of the plate 12 is curved, or arcuate, with its concavity facing outwards from the plate 12. The other side edge 15 is preferably substantially straight so that it may be properly positioned towards the base wall 5 of the caliper body 1 in use.

In the ideal embodiment of the invention, a tab 26,27 are extended from each of the end edges 13,14. The tabs 26,27 are preferably generally coplanar with the plate 12 and are located adjacent the substantially straight side edge 15 at the corners of the plate. The tabs 26,27 are designed for aiding removal of the plate 12 from a caliper with the fingers of a user. The tabs 26,27 are especially designed for models where it its appropriate for use, such as in a Ford truck dual cylinder caliper.

The plate 12 also has a plurality of spaced apart circular holes extending between its surfaces. One of the holes is positioned towards one of the end edges 13 of the plate 12 while the other hole is positioned towards the other end edge 14 of the plate 12. The holes are preferably spaced apart less than about 3 inches from each other and are spaced apart from their associated end edge less than about 1½ inches. Ideally, the holes are also spaced apart from the straight side edge 15 of the plate 12 less than about 1½ inches. In the preferred embodiment, the holes have a diameter to fit a ⅜ inch diameter bolt.

A pair of nuts 18,20,21 are associated with each of the holes of the plate 12. Each of the nuts 18,20,21 has a threaded opening therethrough. One nut of each pair 18,20 is coupled (ideally welded) to the first surface of the plate 12 while the other nut 18,21 of each pair is coupled to the second surface of the plate 12 so that each threaded opening of the nuts 18,20,21 is generally coaxially aligned with its associated hole of the plate 12. An elongate threaded bolt 23,24 (having a threaded end and a head end) is associated with a hole of the plate 12. Each of the bolts 23,24 is threadedly inserted through their associate hole and its associated pair of nuts 18,20,21. Preferably, the bolts 23,24 have a length of less than about 4 inches. The head end of the bolts are designed for extending through an associated opening of the side wall of a caliper body 1, as illustrated in FIG. 1. As illustrated in FIG. 1, the threaded end is designed abutting against the pistons 2 of a caliper assembly or against the inner brake pad 2 (of a dual pad system) so that the pistons 2 can be pushed into their cylinders when the threaded bolts 23,24 are appropriately extended towards them.

In use, the brake tool 10 is inserted into the channel of the caliper body with the head ends of the bolts extending outwards through the holes in the side wall of the caliper body. The tool is positioned so that the straight edge is positioned adjacent the base wall of the caliper body. The bolts are then turned to extend their threaded ends towards the piston or the inner brake pad to push the piston into the piston cylinder. This allow clearance for inserting a new outer brake pad into the channel of the caliper body.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual disk brake pad spreader tool for use with a disc brake assembly having a caliper body, a pair of pistons, and at least one brake pad, the caliper body having a pair of piston cylinders and a side wall, the piston cylinders being spaced apart from the side wall of the caliper body to define a channel for positioning the brake pad, the side wall having a pair of openings therethrough into the channel, said opening being aligned with an associated piston cylinder, each of the pistons being disposable in an associate piston cylinder of the caliper body, the piston being extendable into the channel of the caliper body, said disc brake assembly tool comprising:

a plate being generally rectangular and having first and second surfaces, a pair of end edges, a pair of side edges extending between said end edges, and a plurality of corners, said surfaces of said plate being substantially planar;

said plate having a plurality of spaced apart holes being extended between said surfaces of said plate, one of said holes being positioned towards one of said end edges of said plate, another of said holes being positioned towards another of said end edges of said plate;

a pair of nuts being associated with each of said holes of said plate, each of said nuts having a threaded opening therethrough, one nut of each said pair of nuts being coupled to said first surface of said plate, another nut of each said pair of nuts being coupled to said second surface of said plate, each threaded opening of said nuts being generally coaxially aligned with its associated hole of said plate;

a pair of elongate threaded bolts each having a threaded end and a head end, each of said bolts being associated with a hole of said plate, each of said bolts being threadedly inserted through their associate hole and its associated pair of nuts; and a pair of tabs, each of said end edges having an associated tab being extended therefrom.

2. The tool of claim 1, wherein a length is defined between said end edges of said plate, wherein said length is less than about 6½ inches, wherein a width is defined between said side edges of said plate, wherein said width is less than about 2¾ inches, wherein a thickness is defined between said surfaces of said plate, wherein said thickness is less than about ³⁄₁₆ inch.

3. The tool of claim 1, wherein one of said side edges of said plate is arcuate and has a concavity facing outwards from said plate, and wherein another of said side edges is substantially straight.

4. The tool of claim 1, wherein said corners of said plate are rounded.

5. The tool of claim 1, wherein said tabs are generally coplanar with said plate.

6. The tool of claim 1, wherein said tabs are located adjacent one of said side edges of said plate.

7. The tool of claim 1, wherein said holes are spaced apart less than about 3 inches from each other, said holes being spaced apart from their associated end edge less than about 1½ inches, said holes being spaced apart from one of said side edges of said plate less than about 1½ inches.

8. The tool of claim 1, wherein said bolts have a length of less than about 4 inches.

9. A dual disk brake pad spreader tool for use with a disc brake assembly having a caliper body, a pair of pistons, and at least one brake pad, the caliper body having a pair of piston cylinders and a side wall, the piston cylinders being spaced apart from the side wall of the caliper body to define a channel for positioning the brake pad, the side wall having a pair of openings therethrough into the channel, said opening being aligned with an associated piston cylinder, each of the pistons being disposable in an associate piston cylinder of the caliper body, the piston being extendable into the channel of the caliper body, said disc brake assembly tool comprising:

a plate being generally rectangular and having first and second surfaces, a pair of end edges, a pair of side edges extending between said end edges, and a plurality of corners, said surfaces of said plate being substantially planar, wherein a length is defined between said end edges of said plate, wherein said length is less than about 6½ inches, wherein a width is defined between said side edges of said plate, wherein said width is less than about 2¾ inches, wherein a thickness is defined between said surfaces of said plate, wherein said thickness is less than about ³⁄₁₆ inch;

wherein one of said side edges of said plate is arcuate and has a concavity facing outwards from said plate, and wherein another of said side edges is substantially straight;

wherein said corners of said plate are rounded;

a pair of tabs, each of said end edges having an associated tab being extended therefrom, said tabs being generally coplanar with said plate, said tabs being located adjacent said substantially straight side edge;

said plate having a plurality of spaced apart holes being extended between said surfaces of said plate, one of said holes being positioned towards one of said end edges of said plate, another of said holes being positioned towards another of said end edges of said plate, said holes being spaced apart less than about 3 inches from each other, said holes being spaced apart from their associated end edge less than about 1½ inches, said holes being spaced apart from said straight side edges of said plate less than about 1½ inches;

a pair of nuts being associated with each of said holes of said plate, each of said nuts having a threaded opening therethrough, one nut of each said pair of nuts being coupled to said first surface of said plate, another nut of each said pair of nuts being coupled to said second surface of said plate, each threaded opening of said nuts being generally coaxially aligned with its associated hole of said plate; and a pair of elongate threaded bolts each having a threaded end and a head end, each of said bolts being associated with a hole of said plate, each of said bolts being threadedly inserted through their associate hole and its associated pair of nuts, wherein said bolts have a length of less than about 4 inches.

10. A dual disk brake pad spreader tool, comprising:

a plate having first and second surfaces, a pair of end edges, a pair of side edges;

said plate having a plurality of spaced apart holes extending therethrough between said first and second surfaces of said plate;

a pair of nuts being associated with each of said holes of said plate, each of said nuts having a threaded opening therethrough, one nut of each said pair of nuts being coupled to said first surface of said plate, another nut of each said pair of nuts being coupled to said second surface of said plate, each threaded opening of said nuts being generally coaxially aligned with its associated hole of said plate;

a pair of elongate threaded bolts each having a threaded end and a head end, each of said bolts being associated with a hole of said plate, each of said bolts being threadedly inserted through their associate hole and its associated pair of nuts; and a pair of tabs, each of said end edges having an associated tab being extended therefrom.

11. The dual disk brake pad spreader tool of claim 10, wherein a length is defined between said end edges of said plate, wherein said length is less than about 6½ inches, wherein a width is defined between said side edges of said plate, wherein said width is less than about 2¾ inches, wherein a thickness is defined between said surfaces of said plate, wherein said thickness is less than about 3/16 inch.

12. The dual disk brake pad spreader tool of claim 10, wherein one of said side edges of said plate is arcuate and has a concavity facing outwards from said plate, and wherein another of said side edges is substantially straight.

13. The dual disk brake pad spreader tool of claim 10, wherein said plate has a plurality of rounded corners.

14. The dual disk brake pad spreader tool of claim 10, wherein said tabs are generally coplanar with said plate.

15. The dual disk brake pad spreader tool of claim 10, wherein said tabs are located adjacent one of said side edges of said plate.

16. The dual disk brake pad spreader tool of claim 10, wherein said holes are spaced apart less than about 3 inches from each other, said holes being spaced apart from their associated end edge less than about 1½ inches, said holes being spaced apart from one of said side edges of said plate less than about 1½ inches.

17. The dual disk brake pad spreader tool of claim 10, wherein said bolts have a length of less than about 4 inches.

* * * * *